(12) United States Patent
Fairfield et al.

(10) Patent No.: US 9,201,421 B1
(45) Date of Patent: Dec. 1, 2015

(54) ASSISTED PERCEPTION FOR AUTONOMOUS VEHICLES

(71) Applicant: Google Inc., Mountain View, CA (US)

(72) Inventors: Nathaniel Fairfield, Mountain View, CA (US); Josh Seth Herbach, San Francisco, CA (US); Vadim Furman, Los Gato, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/254,810

(22) Filed: Apr. 16, 2014

Related U.S. Application Data

(60) Provisional application No. 61/909,887, filed on Nov. 27, 2013.

(51) Int. Cl.
G05D 1/00 (2006.01)

(52) U.S. Cl.
CPC ........................................ *G05D 1/00* (2013.01)

(58) Field of Classification Search
USPC ................................................ 701/23, 24, 28
See application file for complete search history.

(56) References Cited

U.S. PATENT DOCUMENTS

| 6,832,251 | B1 * | 12/2004 | Gelvin et al. ................. 709/224 |
|---|---|---|---|
| 7,636,700 | B2 | 12/2009 | Owechko |
| 7,979,173 | B2 | 7/2011 | Breed |
| 8,195,394 | B1 | 6/2012 | Zhu |
| 8,311,858 | B2 * | 11/2012 | Everett et al. .................... 705/4 |
| 8,340,438 | B2 | 12/2012 | Anderson |
| 8,909,415 | B1 * | 12/2014 | Hawley ....................... 701/32.3 |
| 2009/0088924 | A1 * | 4/2009 | Coffee et al. ................... 701/33 |
| 2010/0256859 | A1 * | 10/2010 | Leyerle et al. ................. 701/32 |
| 2012/0239682 | A1 * | 9/2012 | Wedeniwski ................. 707/769 |

OTHER PUBLICATIONS

Savla, Ketan et al., "Human-in-the-loop Vehicle Routing Policies for Dynamis Environments," IEEE Conf. on Decision and Control, 2008, p. 1145-1150.

* cited by examiner

*Primary Examiner* — Yonel Beaulieu

(57) ABSTRACT

Disclosed herein are systems and methods for providing supplemental identification abilities to an autonomous vehicle system. The sensor unit of the vehicle may be configured to receive data indicating an environment of the vehicle, while the control system may be configured to operate the vehicle. The vehicle may also include a processing unit configured to analyze the data indicating the environment to determine at least one object having a detection confidence below a threshold. Based on the at least one object having a detection confidence below a threshold, the processor may communicate at least a subset of the data indicating the environment for further processing. The vehicle is also configured to receive an indication of an object confirmation of the subset of the data. Based on the object confirmation of the subset of the data, the processor may alter the control of the vehicle by the control system.

24 Claims, 10 Drawing Sheets

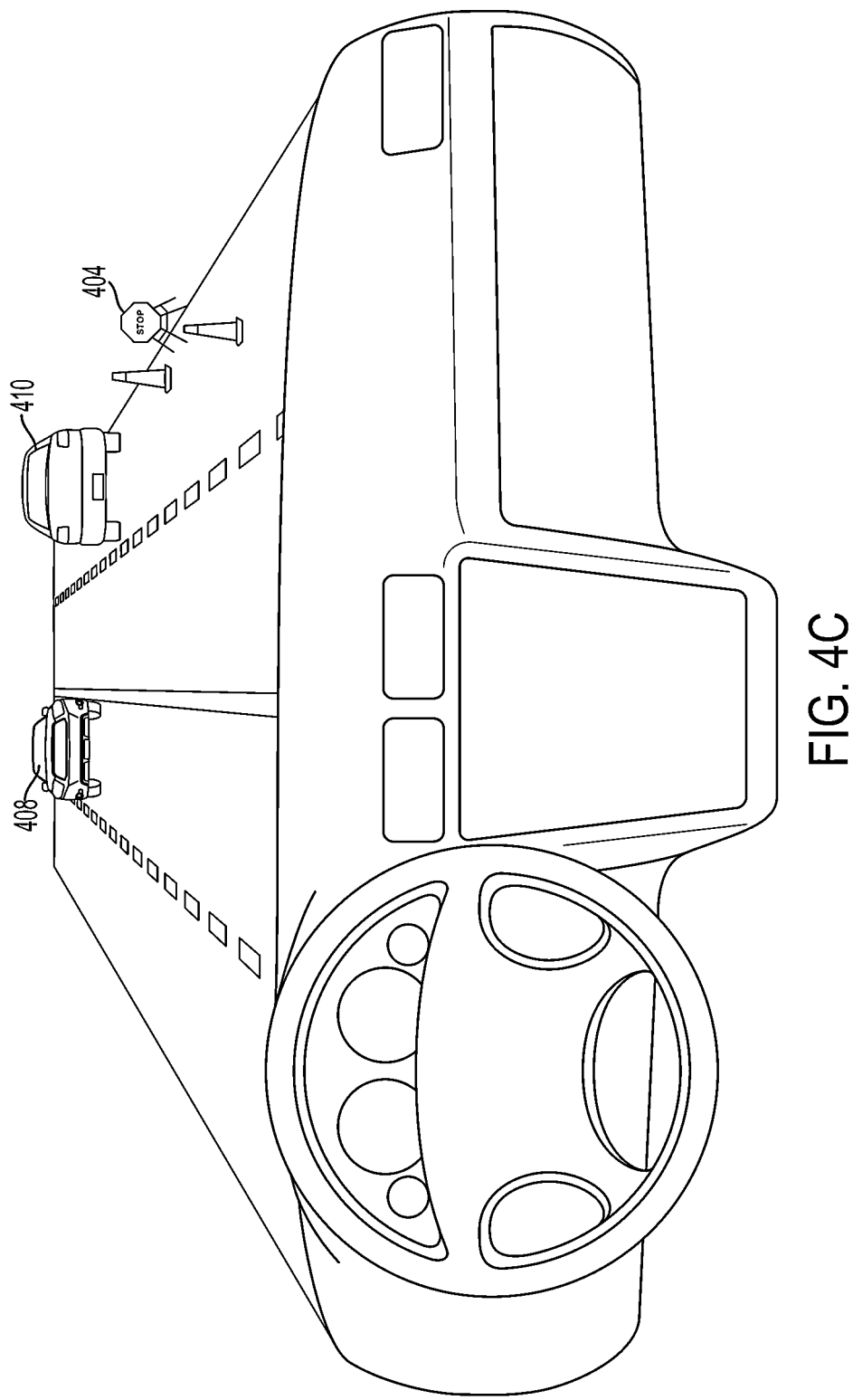

ASSISTED PERCEPTION FOR AUTONOMOUS VEHICLES

CROSS REFERENCE TO RELATED APPLICATION

The present application claims priority to U.S. Patent Application Ser. No. 61/909,887, filed on Nov. 27, 2013, the entire contents of which are herein incorporated by reference.

BACKGROUND

Unless otherwise indicated herein, the materials described in this section are not prior art to the claims in this application and are not admitted to be prior art by inclusion in this section.

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

The present disclosure provides methods and apparatuses that enable a system to take advantage of human operators (or a more powerful computer operators) as part of the object identification of the autonomous vehicle. During the operation of an autonomous vehicle, the vehicle may identify various objects (e.g., features) it detects. However, the autonomous vehicle may have a hard time detecting some objects. Thus, the methods and apparatuses presented herein enable further processing of objects by using a human operator or a more powerful computer system.

An apparatus, such as an autonomous vehicle, disclosed herein includes both a sensor unit and a control system. The sensor unit of the apparatus may be configured to receive data representing objects of an environment of the apparatus. The control system of the apparatus is configured to operate the apparatus. The apparatus also includes one or more processors. The one or more processors may be configured to determine, based on the received data, at least one object of the environment that has a detection confidence below a threshold. The detection confidence may indicate a likelihood that the determined object is correctly identified in the environment. Based on the at least one object having a detection confidence below the threshold, the at least one processor may communicate, from the received data, image data of the at least one object for further processing to a remote operator. Additionally, based on the at least one object having a detection confidence below the threshold, the at least one processor may determine at least one natural-language question associated with the at least one object having a detection confidence below the threshold. The at least one processor may also communicate the at least one natural-language question to the remote operator. The at least one processor may also receive an answer to the at least one natural-language question from the remote operator providing an object indication, and provide instructions to control the apparatus by the control system based on the object indication.

A method disclosed herein includes receiving data by a sensor, where the data represents objects of an environment of an autonomous vehicle. The method also includes operating the autonomous vehicle by a control system. Additionally, the method includes determining, by a processor, based on the received data, at least one object of the environment that has a detection confidence below a threshold, where the detection confidence indicates a likelihood that the determined object is correctly identified in the environment. Based on the at least one object having a detection confidence below the threshold, the method includes the processor communicating, from the received data, image data of the at least one object for further processing to a remote operator. Additionally, based on the at least one object having a detection confidence below the threshold, the method includes determining at least one natural-language question associated with the at least one object having a detection confidence below the threshold. The method also includes communicating the at least one natural-language question to the remote operator. The method also includes the processor receiving an answer to the at least one natural-language question from the remote operator providing an object indication. Further, as a part of the method, the processor may provide instructions to control the autonomous vehicle by the control system based on the object indication.

Also disclosed herein is an article of manufacture including a non-transitory computer-readable medium having stored thereon program instructions that, when executed by a processor in a vehicle system, causes the vehicle system to perform operations. The operations include receiving data by a sensor, where the data represents objects of an environment of an autonomous vehicle. Additionally, the operations include determining, based on the received data, at least one object of the environment that has a detection confidence below a threshold, where the detection confidence indicates a likelihood that the determined object is correctly identified in the environment. Based on the at least one object having a detection confidence below the threshold, the operations include communicating, from the received data, image data of the at least one object for further processing to a remote operator. Additionally, based on the at least one object having a detection confidence below the threshold, the operations include determining at least one natural-language question associated with the at least one object having a detection confidence below the threshold. The operations include communicating the at least one natural-language question to the remote operator. The operations also include receiving an answer to the at least one natural-language question from the remote operator providing an object indication. Further, as a part of the operations, the processor may provide instructions to control the autonomous vehicle by the control system based on the object indication.

An apparatus disclosed herein includes a means for receiving data by a sensor, where the data represents objects of an environment of an apparatus. The apparatus also include means for operating the apparatus by a control system. Additionally, the apparatus includes means for determining, based on the received data, at least one object of the environment that has a detection confidence below a threshold, where the detection confidence indicates a likelihood that the determined object is present or correctly identified in the environment. Based on the at least one object having a detection confidence below the threshold, the apparatus includes means for communicating at least a subset of the received data for further processing to a remote operator. The apparatus also include means for receiving an object confirmation from the remote operator. Further, the apparatus may also include means for altering the instructions to control of the apparatus by the control system based on the object confirmation of the subset of the data.

The foregoing summary is illustrative only and is not intended to be in any way limiting. In addition to the illustrative aspects, embodiments, and objects described above, further aspects, embodiments, and objects will become apparent by reference to the figures and the following detailed description and the accompanying figures.

BRIEF DESCRIPTION OF THE DRAWINGS

FIG. 4C illustrates a video feed taken from the vehicle in FIG. 4A, according to an example embodiment.

DETAILED DESCRIPTION

Figure 1:
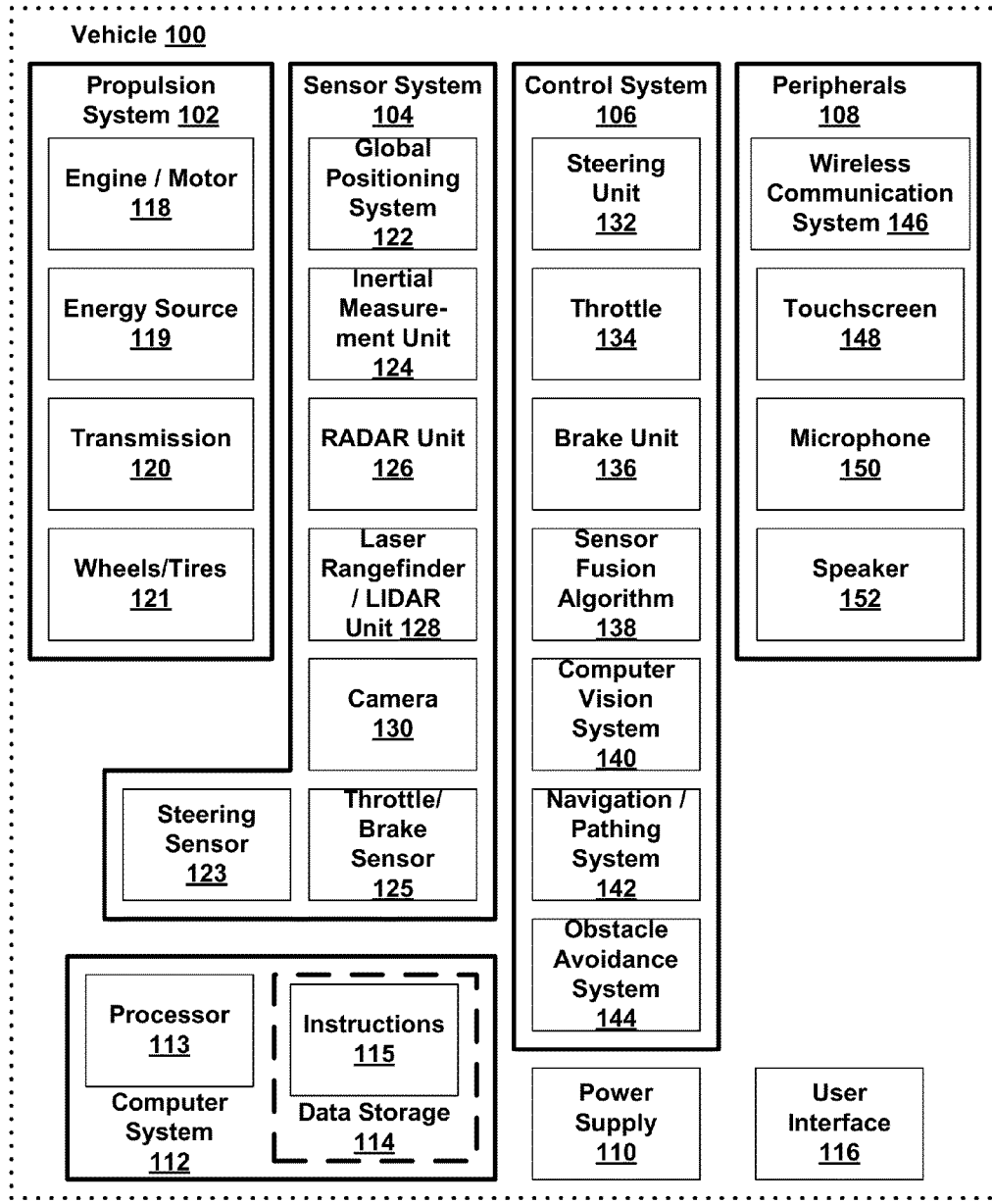
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

The present disclosure provides methods and apparatuses that enable a system to incorporate an input from a human operator (or a more powerful computer operator) as part of the object identification of the autonomous vehicle. Specifically, rather than an autonomous vehicle detecting and identifying every object and driving situation that may be encountered, the present approach allows the vehicle to query a human operator or a more powerful computing system to help make optimal decisions. For example, when an object was identified with a low confidence by the computer system of the vehicle, the autonomous vehicle may display an image to a passenger of the vehicle and/or a remote human operator to identify the object. The object's identification (e.g., identification) may then be used by the control system of the autonomous vehicle. In another example, the image may be sent to a remote server for identification. Because of the relatively limited computing power on the vehicle itself, more complex identification may be performed by a remote server and communicated back to the vehicle.

When developing detectors and classifiers for autonomous systems, there is often a trade-off that can be made between the precision of the system (how often it reports it sees an object A when it fact A doesn't exist in reality) and the recall of the system (how often it misses an object A when the object does exist in reality). A system of the present disclosure includes a system bias to have high recall (at the expense of lower precision) so that the system will generally default toward indicating the presence of an object even when the system has low confidence. When the system detects an object but is not highly confident in the detection of the object, the system can ask a human operator (or a more powerful computer) to confirm that the object does in fact exist. This allows the system to make the right decisions with minimal human input. Thus, the system will generally operate as a highly accurate autonomous system, but the system may request human input or other input when the autonomous system has low confidence in an identification. Additionally, when the system detects an object, but has a low confidence in the detection, the system may operate as if the object really exists. A human operator (or other computing system) may provide an indication that the detection was incorrect, at which point the system will operate as if the erroneous detection was never made. This allows the vehicle to operate with a high precision and affords a safe autonomous operation.

An example of an unusual driving scenario is as follows. There may be an obstacle on the side of a narrow two-lane road, blocking one of the two lanes. The obstacle may not part of a normal identification that the vehicle may perform during most typical operation. Further, the object may be trying to direct traffic in an atypical manner (e.g., so that oncoming traffic and outgoing traffic share the one open lane). If an autonomous vehicle comes up to this scenario, it may detect the existence of the object, but the autonomous vehicle may have a low confidence in detecting the object. For example, the object may be a person located near the side of the road, the autonomous vehicle may attempt to identify whether the person is just someone walking in the road or if the person is attempting to direct traffic and whether he or she is signaling the autonomous vehicle to drive or to stop. In such a case, the autonomous vehicle could detect that this is likely an unusual event and send a camera image (or several, and/or other sensor feeds) to a human operator that could quickly look at the situation and confirm that the autonomous vehicle should stop and wait until it is their turn. The vehicle may also initially operate as if the detected object is indicating the vehicle should stop, while awaiting a confirmation from the human operator. This helps ensure a safe operation of the vehicle in a situation where the confidence of the detection is low.

In other embodiments, the sensors used with the identification may include those other than optical cameras. For example, the sensors may include radar, laser, and audio sensors. Information from any of these sensors may be used to augment the autonomous identification based on human input. In one additional example, a microphone on an autonomous vehicle may capture a sound. The identification system may not be able to detect if the sound is either (i) actually a siren or (ii) part of a song. The present disclosure may use either human interaction or further computing processing by a more powerful remote computer in order to determine if the sound includes a siren signal.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could be configured to operate fully or partially in an autonomous mode. While in autonomous mode, the vehicle 100 may be configured to operate without human interaction. For example, a computer system could control the vehicle 100 while in the autonomous mode, and may be operable to operate the vehicle an autonomous mode. As part of operating in the autonomous mode, the vehicle may identify objects of the environment around the vehicle. If one or more of the identified objects has an associated confidence below a confidence threshold, the computer system may transmit data related to the object for further processing. The computer system may receive an indication of the object, from either a remote computer or a human operator. In response, the computer system may alter the control of the autonomous vehicle.

The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 118 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, within the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position.

In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental objects (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short-range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data stored in the data storage 114 to determine specific road parameters. Further, the radar unit 126 may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

In some embodiments, the computer system 112 may make a determination about various objects based on data that is provided by systems other than the radio system. For example, the vehicle may have lasers or other optical sensors configured to sense objects in a field of view of the vehicle. The computer system 112 may use the outputs from the various sensors to determine information about objects in a field of view of the vehicle. The computer system 112 may determine distance and direction information to the various objects. The computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
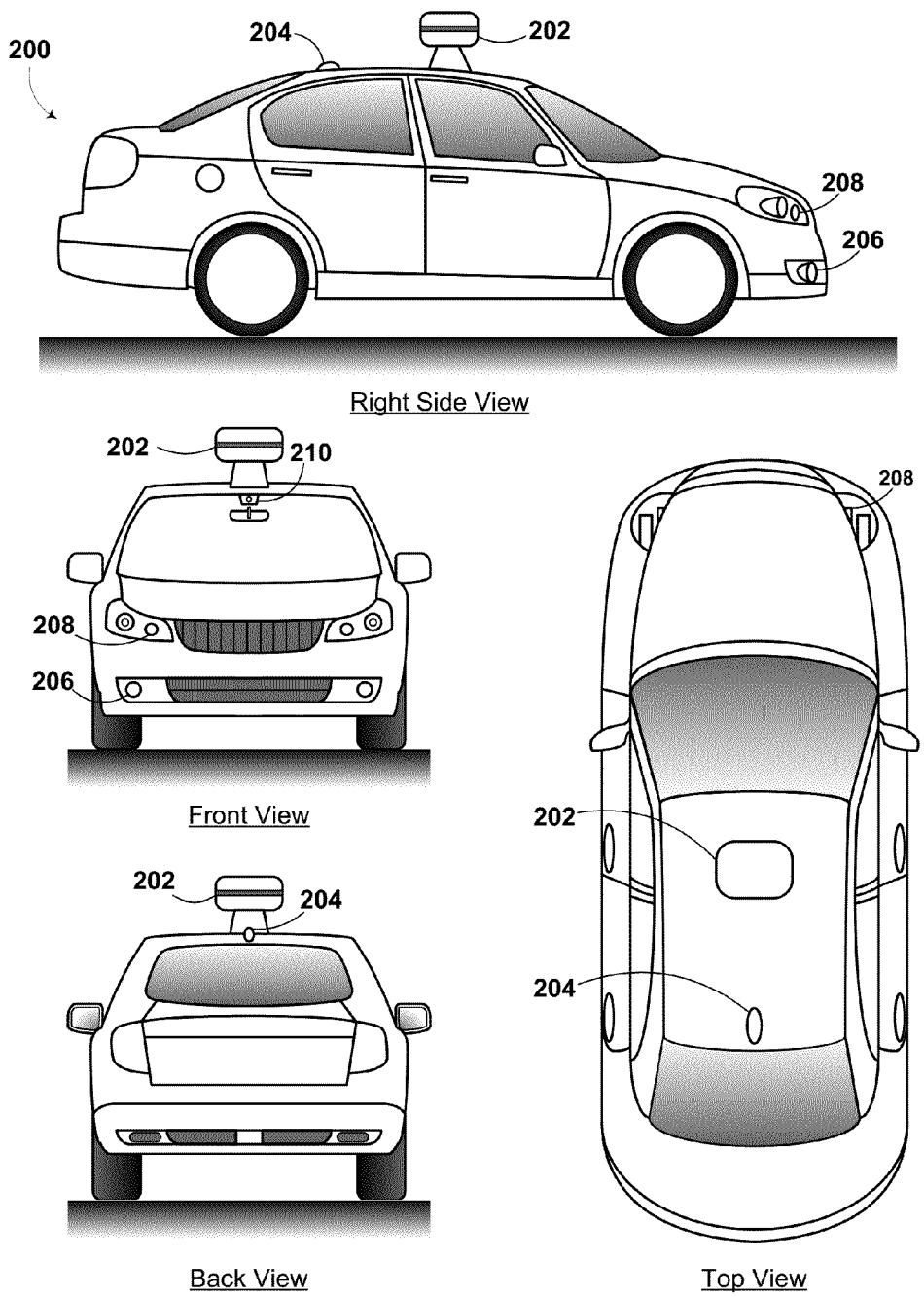
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 204, a radio unit 206, a laser rangefinder 208, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, radio devices (e.g., Bluetooth and/or 802.11), and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radio unit 206 and laser range finder 208.

The wireless communication system 204 could be located as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short-range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3:
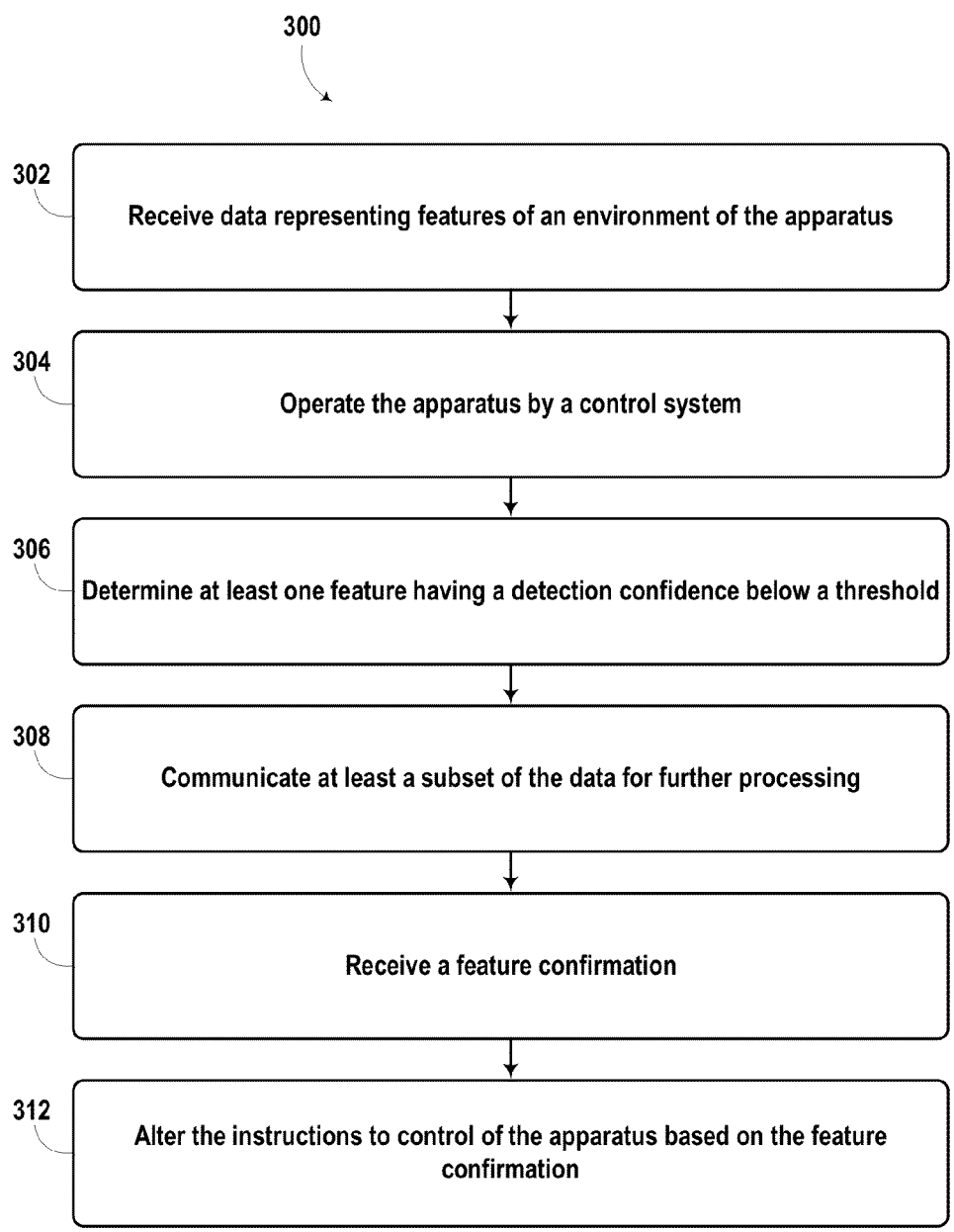
FIG. 3 shows a method, according to an example embodiment.

A method 300 is provided for enabling a system to take advantage of human operators (or a more powerful computer) as part of the object identification of the autonomous vehicle. The method could be performed using any of the apparatus shown in FIGS. 1-2 and FIGS. 4-5 and described herein; however, other configurations could be used as well. FIG. 3 illustrates the blocks in an example method. However, it is understood that in other embodiments, the blocks may appear in different order and blocks could be added, subtracted, or modified. Additionally, the blocks may be performed in a linear manner (as shown) or may be performed in a parallel manner (not shown).

Block 302 includes the vehicle receiving data representing objects an environment in which the vehicle operates. In various embodiments, the vehicle may receive data representing objects in an environment in which the vehicle operates in a variety of ways. A sensor system on the autonomous vehicle may provide the data representing objects of the environment. For example, a vehicle may have various sensors, including a camera, a radar unit, a laser range finder, a microphone, a radio unit, and other sensors. Each of these sensors may communicate data to a processor in the vehicle about information each respective sensor receives.

In one example, a camera may be configured to capture still images and/or video. In various embodiments, the vehicle may have more than one camera positioned in different orientations. Also, in some embodiments the camera may be able to move to capture images and/or video in different directions. The camera may be configured to store captured images and video to a memory for later processing by a processing system of the vehicle. The captured images and/or video may be the data indicating an environment.

In another example, a radar unit may be configured to transmit an electromagnetic signal that will be reflected by various objects near the vehicle. The radar unit may be able to capture reflected electromagnetic signals. The captured reflected electromagnetic signals may enable the radar system (or processing system) to make various determinations about objects that reflected the electromagnetic signal. For example, the distance and position to various reflecting objects may be determined. In various embodiments, the vehicle may have more than one camera in different orientations. The radar system may be configured to store captured information to a memory for later processing by a processing system of the vehicle. The information captured by the radar system may be data indicating an environment.

In a yet further example, a laser range finder may be configured to transmit an electromagnetic signal (e.g., light, such as that from a gas or diode laser, or other possible light source) that will be reflected by a target objects near the vehicle. The laser range finder may be able to capture the reflected electromagnetic (e.g., laser) signals. The captured reflected electromagnetic signals may enable the range-finding system (or processing system) to determine a range to various objects. The range-finding system may also be able to determine a velocity or speed of target objects and store it as data indicating an environment.

Additionally, in an example, a microphone may be configured to capture audio of environment surrounding the vehicle. Sounds captured by the microphone may include emergency vehicle sirens and the sounds of other vehicles. For example, the microphone may capture the sound of the siren of an emergency vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the data indicating an environment.

One more example has the radio unit being configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the data indicating an environment.

In some embodiments, the processing system may be able to combine information from the various sensors in order to make further determinations of the environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the environment.

Block 304 includes a control system controlling the operation of the vehicle, while the vehicle operates in an autonomous mode. In some instances, block 304 may be performed while block 302 is being performed. While operating in the autonomous mode, the vehicle may use a computer system to control the operation of the vehicle with little-to-no human input. For example, a human-operator may enter an address into an autonomous vehicle and the vehicle may then be able to drive, without further input from the human (e.g., the human does not have to steer or touch the brake/gas pedals), to the specified destination.

While the vehicle is operating autonomously, the sensor system may be receiving data about the environment of the vehicle, as disclosed with respect to block 302. The processing system of the vehicle may alter the control of the vehicle based on data received from the various sensors. In some examples, the autonomous vehicle may alter a velocity of the autonomous vehicle in response to data from the various sensors. The autonomous vehicle may change velocity in order to avoid obstacles, obey traffic laws, etc. When a processing system in the vehicle identifies objects near the autonomous vehicle, the vehicle may be able to change velocity, or alter the movement in another way.

As previously stated, there is often a trade-off that can be made between the precision of the system (how often it reports it sees an object when it fact the object doesn't exist in reality) and the recall of the system (how often it misses an object when the object does exist in reality). The system of the present disclosure includes a system bias to have high recall (at the expense of lower precision) so that the system will generally default toward indicating the presence of an object even when the system has low confidence. When the system detects an object but is not highly confident in the detection of the object, the system can ask a human operator (or a more powerful computer) to confirm that the object does in fact exist. Thus, the system will generally operate as a highly accurate autonomous system. For example, in some embodiments, even when the vehicle has a low confidence of a detected object, it may alter a movement of the autonomous vehicle in order to make sure the vehicle is operated safely.

Block 306 includes the vehicle analyzing the data representing objects of the environment to determine at least one object having a detection confidence below a threshold. A processor in the vehicle may be configured to calculate various objects of the environment based on data from the various sensors. For example, in one embodiment, the processor is configured to detect objects that may be important for an autonomous vehicle to recognize. Objects may include pedestrians, street signs, other vehicles, indicator signals on other vehicles, and other various objects detected in the captured data.

The detection confidence may indicate or be indicative of a likelihood that the determined object is correctly identified in the environment, or is present in the environment. For example, the processor may perform object detection of objects within image data in the received data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various way depending on the source of the data. In some embodiments, the data representing objects of the environment may come from a camera and be image (or video) data. In other embodiments, the data representing objects of the environment may come from a LIDAR unit. The vehicle may analyze the captured image or video data to identify objects. The vehicle may include methods and apparatuses configured to detect objects in image or video data. The methods and apparatuses may be configured to monitor image and/or video data for the presence of objects of the environment. In other embodiments, the data representing objects of the environment may be radar, audio, or other data. The vehicle may be configured to identify objects of the environment based on the radar, audio, or other data. In these embodiments, vehicle may include methods and apparatuses configured to detect objects based on the type of data. In some embodiments, the detection methods the vehicle uses may be based on a set of known data. For example, data related to environmental objects may be stored to the vehicle. The vehicle may compare received data to the stored data to determine objects. In other embodiments, the vehicle may be configured to determine objects based on the context of the data. For example, street signs related to construction may generally have an orange color. The vehicle may be configured to detect objects that are orange, and located near the side of roadways as construction-related street signs. Additionally, when the processing system of the autonomous vehicle detects objects in the captured data, it also may calculate a confidence for each object.

Further, the autonomous vehicle may also have a confidence threshold. The confidence threshold may vary depending on the type of object being detected. For example, the confidence threshold may be lower for some object that may require a quick action from the autonomous vehicle, such as brake lights on another vehicle. However, in other embodiments, the confidence threshold may be the same for all detected objects. If the confidence associated with a detected object is greater than the confidence threshold, then the vehicle may assume the future was correctly recognized and adjust the control of the autonomous vehicle to compensate. How the vehicle reacts when the confidence associated with a detected object is less than the confidence threshold depends on the specific embodiment. In some embodiments, the vehicle may react as if they detected object exists despite the low confidence level. In other embodiments, the vehicle may react as if the future was detected incorrectly, and does not really present.

When the vehicle detects an object of the environment, it may also calculate a confidence associated with the specific detected object. The confidence may be calculated in various ways depending on the embodiment. In one example, when detecting objects of the environment, the vehicle may compare data representing objects of the environment to predetermined data relating to known objects. The closer the match between the data representing objects of the environment to predetermined data, the higher the confidence. In other embodiments, the vehicle may detect objects based on a mathematical analysis of the data representing objects of the environment. The mathematical analysis may create a confidence based on the mathematical analysis.

Block 308 includes the vehicle communicating at least a subset of the data indicating the environment for further processing to a secondary-processing device. Because detecting objects of the environment can be important to the operation of an autonomous vehicle, an object with a confidence below the threshold may have the data associated with it communicated for further processing. In some embodiments, the subset of the data communicated may be image data captured by the vehicle. Thus, the image data of the object can be communicated to a remote operator for further processing. In some examples, a bounding box can be providing substantially around the object in the image data, and then the image data is communicated to the remote operator so that the remote operator can readily and quickly identify the object in the image data (e.g., the object in the bounding box) for which there is a question.

In some embodiments, when the object is detected as having a confidence below the confidence threshold, the object may be given a preliminary identification. The control system of the vehicle may adjust the operation of the vehicle in response to this preliminary identification. For example, altering the movement of the vehicle may include stopping the vehicle, switching the vehicle to a human-controlled mode, changing a velocity of vehicle (e.g., a speed and/or direction), or other movement alteration.

In additional embodiments, when the object is detected as having a confidence below the confidence threshold, a processing device located in either the vehicle or in another computing system may generate a natural-language question based on the identification of the object. For example, the natural-language question may be, "Is this a stop sign?" In other examples, the natural-language question may take other forms such as, "Is this a construction sign?" Other various natural-language questions may be generated based on the detected object. The natural language question may be based on a result of the object detection of the object, or based on the preliminary identification of the object, so as to ask the remote operator to confirm or deny whether the preliminary identification is correct.

Additionally, the natural-language question may be communicated for further processing to the secondary-processing device.

In various embodiments, the further processing with the secondary-processing device may take different forms. In one embodiment, a human operator provides input to the secondary-processing device as part of the further processing. The human operator can either confirm the identified object with the low confidence or the human operator can correctly identify the object. The human operator may be located within the autonomous vehicle, such as a passenger in the passenger seat or a person sitting in the driver's seat. Or, in other embodiments, the human operate may be located in a location that is not near the autonomous vehicle. For example, a remote human operator may be located at a remote computer terminal. This human operator may receive data from one or more autonomous vehicle and provide an identification of various objects for each autonomous vehicle that communicates data to the human operator.

The human operator may be provided with a representation of the subset of the data indicating the environment for further processing (e.g., an image). The human operator may provide an input indicating a correct identification by the autonomous vehicle processing system, or may indicate the system identified the object incorrectly. If the system identified the object incorrectly, the human operator may be able to provide a correct identification. For example, the human operator may be presented with both the natural-language question and captured image data. The human operator may answer the natural-language question based on the human operator inspecting the image. For example, the human operator may indicate yes or no based on his or her perception of an image when the natural-language question asks, "Is this a stop sign?"

In other embodiments, a more powerful computer, such as a remote computer server, performs the further processing. The more powerful computer can either confirm the identified object with the low confidence or the more powerful computer can correctly identify the object. The more powerful computer may have a much larger computational power than the computing system in the autonomous vehicle, thus the more powerful computer may able to more accurately identify objects of the environment. In some embodiments the autonomous vehicle may wirelessly communicate the subset of the data indicating the environment to the remote computing device. The more powerful computer may confirm a correct identification by the autonomous vehicle processing system, or the more powerful computer may indicate the system identified the object incorrectly. If the system identified the object incorrectly, the more powerful computer may be able to provide a correct identification.

In further embodiments, the more powerful computer may also not be able to correctly identify the object of the environment. When this happens, the system may fall back to a human operator performs the further processing. In this embodiment, the identification may have three stages. First, the computing system in the autonomous vehicle may attempt to identify the object. If the identification is below a threshold confidence, a more powerful computer may be used in attempt to identify the object of the environment. If the more powerful computer also classifies the object below the threshold confidence, a human operator performs the further processing to provide a identification for the object of the environment. Therefore, the human operator and the more powerful computer may work in tandem to identify objects of the environment of the vehicle.

Additionally, in some embodiments, the more powerful computer and the human operator may both receive data when the identified object has low confidence. Therefore, either the more powerful computer or the human operator (and possibly both) may be able to either confirm the identified object with the low confidence or correctly identify the object. By transmitting data to both the more powerful computer and the human operator at approximately the same time, any latency issues with either the more powerful computer or the human operator may be minimized. Further, when an object has been identified, a global map that all vehicles may access may be updated to include the new identified object. In some other embodiments, vehicles may communicate the identification of the object to other nearby vehicles.

Block 310 includes the vehicle receiving an indication of an object confirmation of the subset of the data. The vehicle may receive an indication of an object confirmation of the subset of the data in a variety of ways. Because either a human operator or a more powerful computer may determine the indication of an object confirmation of the subset of the data, the source of the indication of an object confirmation of the subset of the data may change. Therefore, the receiving may be different in various embodiments. An object confirmation includes an indication of an object that is present in the at least a subset of the data that was communicated further processing to a secondary-processing device at Block 308. For example, the object confirmation may be a correct identification of road sign. In another situation, the object confirmation may include an identification that an audio sample contains an emergency vehicle siren signal. In some examples, the remote operator may provide an answer to the natural-language question providing an object indication (e.g., indicating that the object is in fact a stop sign).

In some embodiments, such as those where the further processing of block 308 is performed at a location collocated with the vehicle; the receiving an object confirmation includes an occupant of the vehicle entering information into a computer system. Thus, in some embodiments the receiving may be performed when a person located in the vehicle provides an input or information.

In other embodiments, such as those where the further processing of block 308 is performed at a location that is not collocated with the vehicle, the receiving an object confirmation may include wirelessly receiving the object confirmation. In some embodiments, even when the further processing of block 308 is performed at a location that is collocated with the vehicle, the receiving an object confirmation of the subset of the data may include wirelessly receiving the object confirmation. For example, the object confirmation may be transmitted to the autonomous vehicle from a remote more powerful computer system or from a remote human operator. In this example, because the more powerful computer system or from a remote human operator is not collocated with the autonomous vehicle. Therefore, the object confirmation may be wirelessly communicated to the autonomous vehicle.

In another example, a human operator who is collocated with the autonomous vehicle, such as a passenger, may possess a mobile device. The human operator may cause the object confirmation to be transmitted to the autonomous vehicle from the mobile device. Therefore, the receiving an object confirmation of the subset of the data may include wirelessly receiving the indication even when the further processing of block 308 is performed at a location that is collocated with the vehicle.

Block 312 includes the vehicle altering the control of the apparatus by the control system based on the object confirmation of the subset of the data. When the vehicle receives the object confirmation of the subset of the data, the object confirmation may be communicated to the control system of the vehicle. Based on the object confirmation, the vehicle may alter the control of the vehicle. The control of the vehicle may be altered based on the object confirmation of the subset of data. In other examples, the processor may provide instructions to control the autonomous vehicle by the control system based on the object indication received from the remote operator.

In some examples, the object confirmation of the subset of the data may indicate the presence of an object that the autonomous vehicle was not aware of before it received the object confirmation of the subset of the data. In another embodiment, the object confirmation of the subset of the data may indicate that an object is different from how the processing system identified the object. In yet a further embodiment, the object confirmation of the subset of the data may indicate an object identified by the autonomous vehicle was not actually present in the environment (e.g., a false positive). In each of these three examples, the object confirmation of the subset of the data provides information to the autonomous vehicle that has different objects than the autonomous vehicle determined. Therefore, to continue safe operation of the autonomous vehicle, the control of the vehicle may be altered.

For example, altering the movement of the vehicle may include stopping the vehicle, switching the vehicle to a human-controlled mode, changing a velocity of vehicle (e.g., a speed and/or direction), or other movement alteration.

Figure 4A:
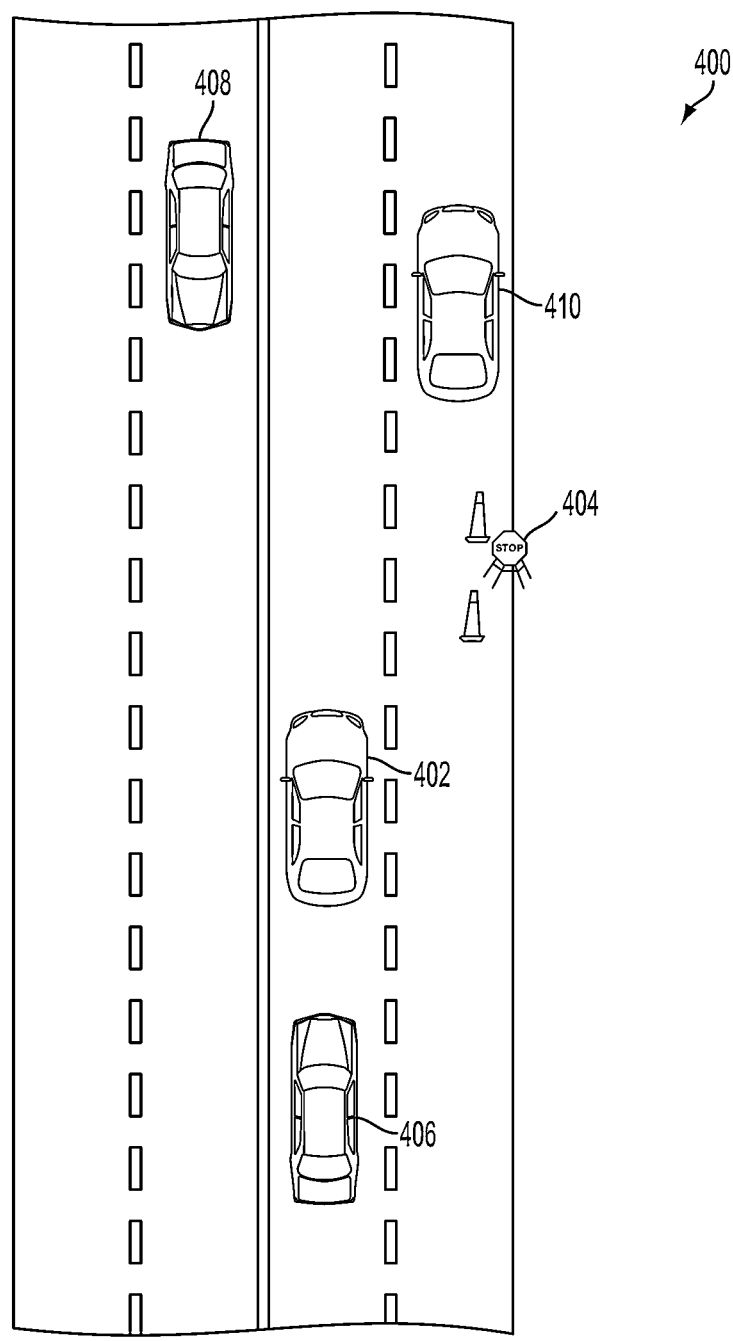
FIG. 4A illustrates a top view of an autonomous vehicle operating scenario, according to an example embodiment.

FIG. 4A illustrates a top view of a scenario encountered by an autonomous vehicle, in accordance with an example embodiment. As shown, an autonomous vehicle 402 may be operating within an environment 400 containing other vehicles 406, 408, and 410. The autonomous vehicle 402 may be operating in an autonomous mode with a lane of travel when it approaches an obstacle in the road, in this example a temporary stop sign 404.

Figure 4B:
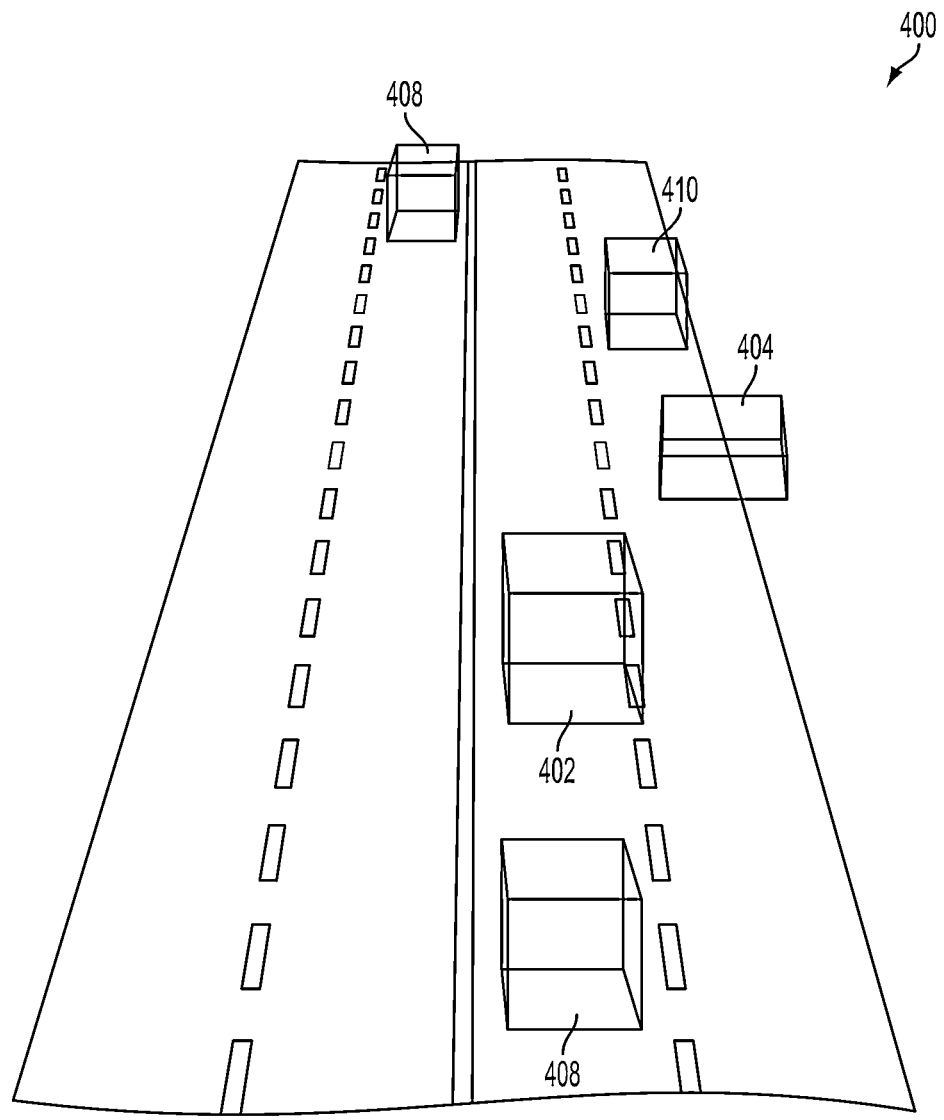
FIG. 4B illustrates a sensor data representation of the scenario from FIG. 4A, according to an example embodiment.

The autonomous vehicle 402 may create a representation of its environment 400 based on any combination of possible types of sensor data as described above. FIG. 4B illustrates a representation of the environment from FIG. 4A based on sensor data collected by the vehicle, according to an example embodiment. In some examples, the representation may not be a perfect copy of the environment. For instance, some of the sensors may be blocked in certain directions or some of the sensor data may be distorted. Additionally, some objects may be abstracted into geometric shapes, such as the representations of the vehicles 406, 408, and 410 or the temporary stop sign 404 shown in the figure. The autonomous vehicle 402 may identify objects or other aspects of the environment with varying levels of precision.

The situation depicted in FIG. 4A and FIG. 4B may be a situation in which the vehicle's confidence level drops below a predetermined threshold level. The drop in confidence may be based on one or more different factors about the vehicle's operation and/or the vehicle's view of the environment. For example, the vehicle 402 may not be able to create a complete sensor representation of its environment because the temporary stop sign 404 may be obstructing its views of aspects of the environment (e.g., other cars). Additionally, the vehicle 402 may not be able to identify with confidence one or more objects within the environment, possibly including the temporary stop sign 404. Also, aspects of the vehicle's own operation may also cause its confidence level to drop. For instance, the vehicle may have stopped behind the temporary stop sign 404, and may have remained stuck there for a certain period of time, which may trigger a warning from one of the vehicle's systems. In some examples, if the vehicle 402 is stuck for more than a predetermined set amount of time (e.g., 1 minute or 5 minutes), its confidence level may begin to drop. Other factors may contribute to the vehicle's determination that its confidence in how to proceed (e.g., whether to continue waiting or to do something else) has fallen to a level where the vehicle should request remote assistance.

FIG. 4C shows a video stream of the environment 400 of autonomous vehicle 402 from the point-of-view of the autonomous vehicle 402. For example, the autonomous vehicle 402 may be equipped with one or more video cameras which capture video streams of a portion of the environment 400. This data may be transmitted along with the request with assistance for use by the remote operator. In this example, the portion of the environment 400 captured in the video stream includes the temporary stop sign 404 as well as parts of cars 408 and 410 that are not obstructed by the temporary stop sign 404. In some examples, the cameras may be moveable (and possibly may be controlled directly or indirectly by a remote operator) in order to capture video of additional portions of the environment 400 in order to resolve certain scenarios.

In further examples, the request for assistance may additionally include one or more suggested autonomous operations for the vehicle to take in the identified situation. For example, referring back to the scenario described with respect to FIG. 4, the vehicle may transmit options that may include holding position or attempting to pass the obstacle on the left.

In one example, the vehicle may send a single suggested operation in order to receive verification of its proposed course of action, and may hold position until a response is received. In other examples, the vehicle may send a set of two or more proposed options for the remote assistor to select from. In some cases, the vehicle may not be able to propose a course of action. In such examples, the human guide may be able to propose a course of action for the vehicle to take, or a set of two or more possible courses of action.

In additional examples, the request for assistance may involve multiple parts. For example, the vehicle may ask a series of questions of the remote assistor in order to determine how to proceed with operation. For example, a user interface may include a natural-language question to aid in providing the input to the autonomous vehicle. For example, referring to the situation depicted in FIG. 4A, the vehicle 402 may first request assistance in order to identify the obstacle in the road as a temporary stop sign 404. The vehicle 402 may then make a second request in order to determine how best to proceed given that the obstacle has been identified as a temporary stop sign 404. Other more complicated discourses between the vehicle 402 and remote operator are possible as well.

Figure 4D:
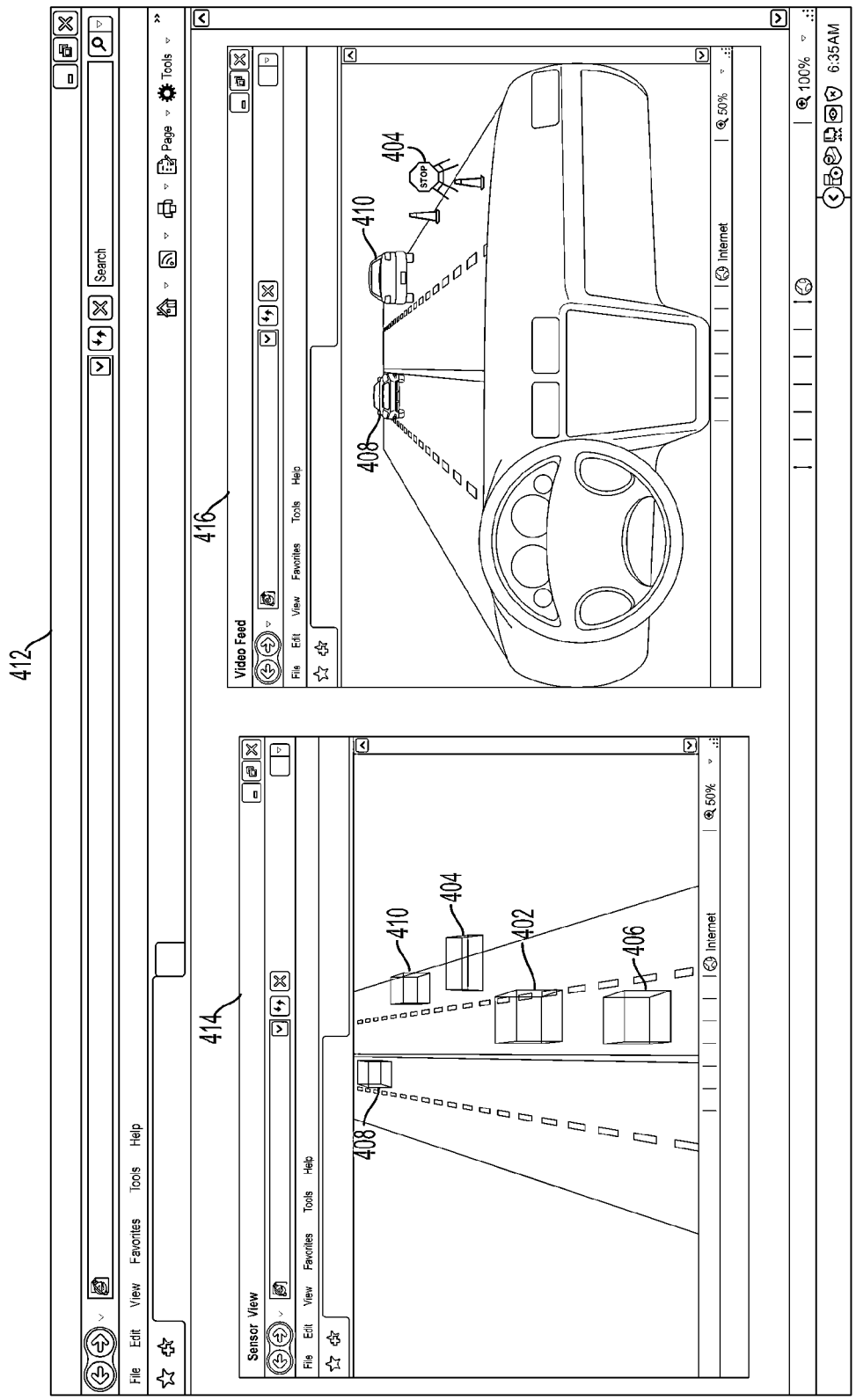
FIG. 4D illustrates a graphical interface containing the sensor data representation from FIG. 4B and the video feed from FIG. 4C, according to an example embodiment.

In some examples, the human operator may be located in a remote location that has a wireless connection with a communication system of the vehicle. For example, a remote human operator may be located at a remote computer terminal with a graphical interface that provides information from the autonomous vehicle in order for the human operator to answer the request. For instance, FIG. 4D shows one example graphical interface that may be presented to a human operator. The graphical interface 412 may include separate sub-windows 414 and 416. The first sub-window 414 may include the vehicle's sensor data representation of its environment, such as described above with respect to FIG. 4B. The second sub-window 416 may include a video stream of a portion of the environment, such as described above with respect to FIG. 4C. Accordingly, the human operator may be able to compare the vehicle's understanding of its environment with the video stream to verify the vehicle's representation of its environment and/or to verify or suggest a planned course of action of the vehicle.

Figure 4E:
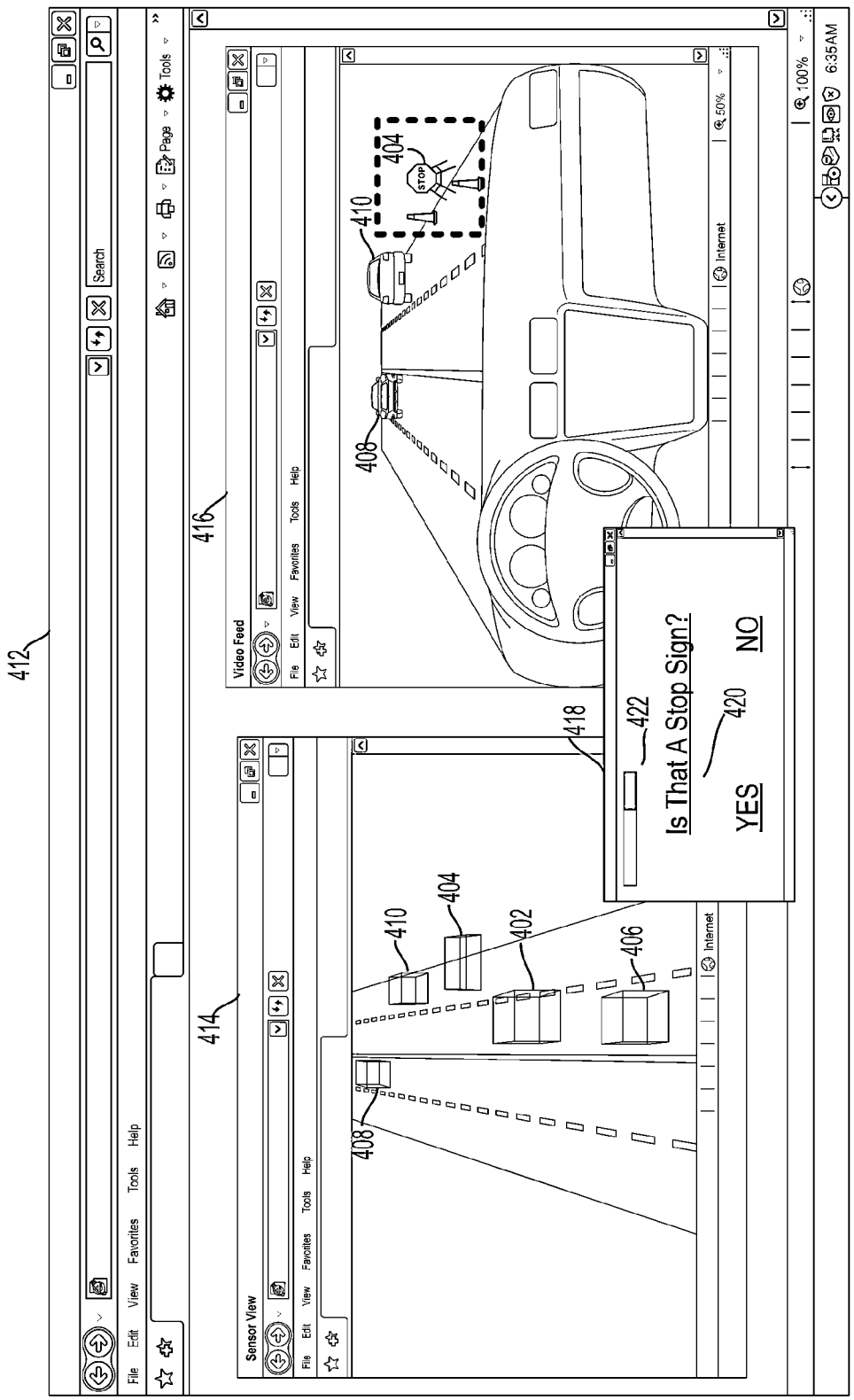
FIG. 4E illustrates the graphical interface from FIG. 4D including a control menu, according to an example embodiment.

The remote assistor may be presented with a graphical interface that contains a control menu that enables a remote assistor to send a response to a vehicle indicating a proposed autonomous mode of operation. For example, FIG. 4E shows an example graphical interface that contains a first sub-window showing the vehicle's sensor data representation of its environment and a second sub-window showing a video stream of a portion of the vehicle's environment, such as described above with respect to FIG. 4D. FIG. 4E additionally contains a control menu 418 that may allow a human operator to respond to a natural-language question. Depending on the type of response provided to the vehicle, the control menu 418 may allow the operator to input guidance to the vehicle in a number of different ways (e.g., selecting from a list of operations, typing in a particular mode of operation, selecting a particular region of focus within an image of the environment, etc.).

In the example depicted in FIG. 4E, the human guide may indicate a natural-language question 420 to identify the object identified as the temporary stop sign 404. Additionally, when an identification is confirmed, the identification may be added to a global map. When the identification is added to the global map, other vehicles may not have to request an identification of the object in the future. The control menu 418 may additionally contain a latency bar 422 indicating how old the received sensor data is, which may affect the human guide's response.

The response to the request for assistance may be received in a number of different ways. In cases where the request for assistance was sent to a remote assistor (or a remote computing system) not located within the vehicle, the response may be received wirelessly through a communication system located within the autonomous vehicle. In other embodiments, such as those where the request for assistance was sent to a passenger located with the vehicle, the response may be received when the passenger enters an autonomous operation into a graphical interface of a computer system located within the vehicle. A passenger may be able to instruct the vehicle in other ways as well, such as through voice commands or through a handheld mobile device. Other modes of transmitting and/or receiving the request for assistance and/or the response to the request may also be used.

Figure 5:
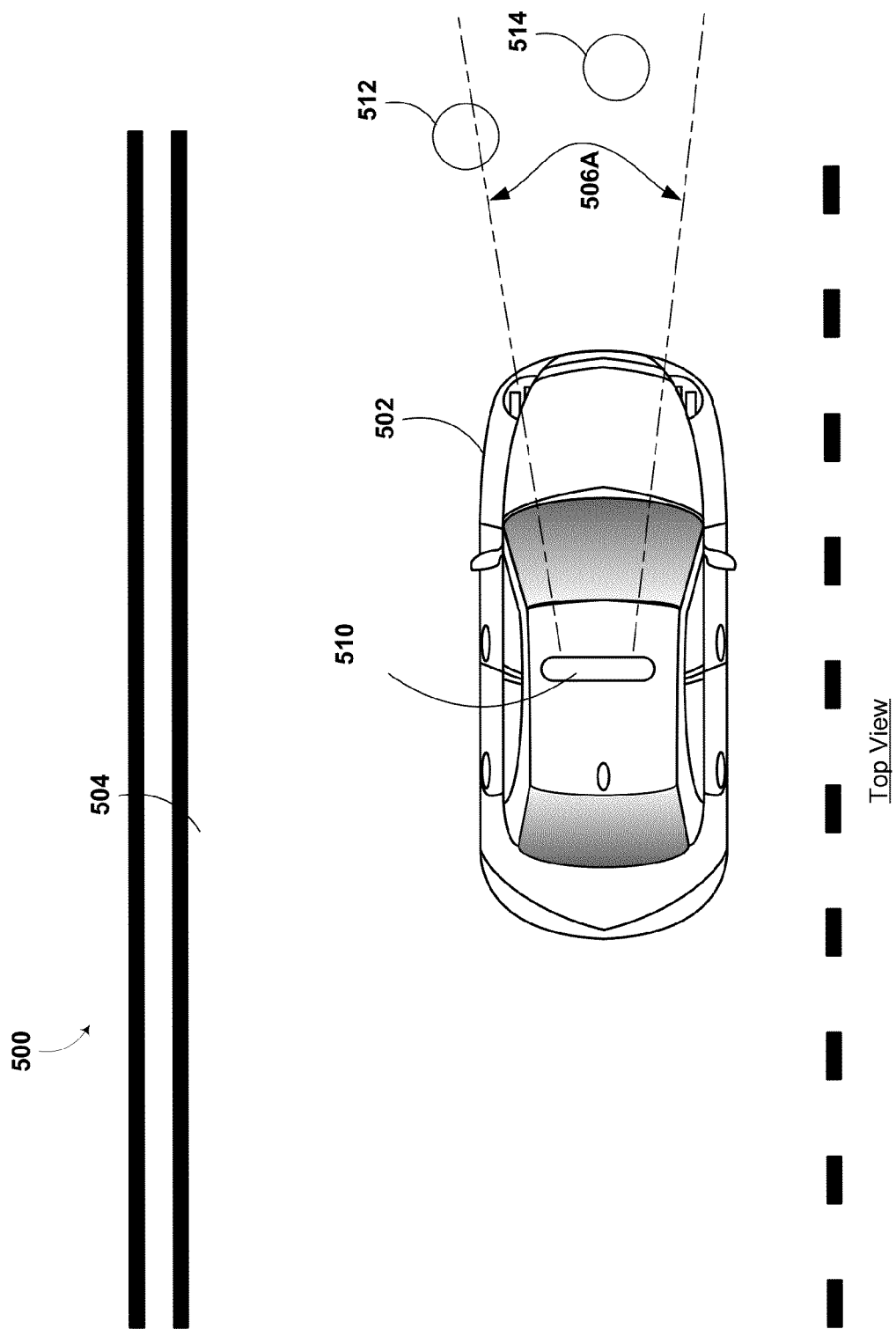
FIG. 5 is a top view of an autonomous vehicle during operation, according to an example embodiment.

FIG. 5 illustrates an example scenario 500 involving a vehicle 502 traveling down a roadway 504. Vehicle 502 could be operating in an autonomous mode. Further, the vehicle 502 may be configured with a sensor unit 510. In one example, the sensor unit 510 may have a sensor, such as a camera, that has a field of view 506A. The field of view 506A may correspond to a region of where the camera may be able to capture an image. In another embodiment, sensor unit 510 may include a radar unit. The field of view 506A may correspond to a region over which the radar unit may send and receive signals. In other embodiments, the field of view 506A may not be limited to a single region in front of the vehicle, but instead may correspond to the entire region (e.g., 360-degrees) around the vehicle. FIG. 5 illustrates an example scenario 500 in which the sensor unit uses a camera to obtain data about the environment of the vehicle. The description of FIG. 5 can also be used with other sensors, not just an optical sensor like a camera.

As one example embodiment, as shown FIG. 5, there may be two environmental objects at least partially within the field of view 506A of a vehicle 502. In this example, it is assumed that the field of view 506A is that of an optical sensor, such as a camera. The camera of the sensor unit 510 may take a picture or video. This picture video will be analyzed to determine objects of the environment.

When the camera in the sensor unit 510 captures a video or image, a first object 514 may fall completely within the field of view 506A. A second object 512 may only partially be located within the capture picture or video. When a processing system in the vehicle 502 analyzes the picture or video, it may be able to successfully identify an object, such as the first object 514. However, the processing system may not be able to successfully identify the second object 512 (or it may identify the object 512 with a low confidence). The processing system may not be able to successfully identify the second object 512 for many different reasons. In some embodiments, the data of the environment may not include enough information to successfully identify the second object 512 automatically. For example, the second object 512 may be a street sign. An image captured by the vehicle may have a portion of the street sign cut off. The detection system of the vehicle may not be able to correctly identify the cut off street sign. In another example, an object may be partially obscured, so automatic identification may not work accurately. In still another embodiment, an object may be deformed or damaged in such a way that the detection system of the vehicle may not be able to accurately detect the object.

Thus, the processing system may communicate data associated with the captured image or video for further processing. When a human views the resulting image or video, he or she may be able to successfully identify the second object 512, despite the future only partially being in the field of view 506A. In other embodiments, rather than communicating data to a human, the vehicle may communicate data to a more powerful computer system, which is remotely located, for further processing.

Although FIG. 5 was described with respect to pictures and video, the sensor unit 510 may have other sensors, which capture data that is not visible light. Therefore, the disclosed methods and apparatuses are not limited to just optical data collection. Additionally, the identification shown in FIG. 5 was described as having a misidentification due to the second future 512 only partially being within the field of view. In some embodiments, a misidentification can occur even though the full object is located in an image or video. It doesn't need to only partially up here in the image or video.

It will be understood that there are other similar methods that could describe receiving data representative of an electromagnetic signal, receiving an indication of a movement of the vehicle, determining a movement parameter based the indication of the movement of the vehicle, and recovering the distance and direction information from the electromagnetic signal, based on the movement parameter. Those similar methods are implicitly contemplated herein.

Figure 6:
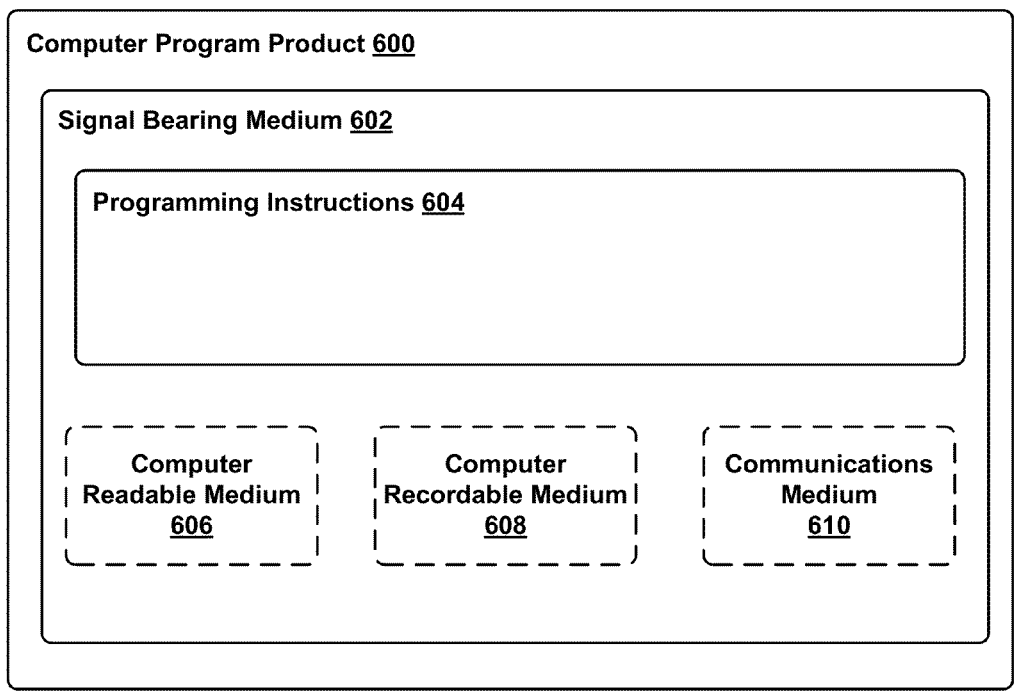
FIG. 6 is a schematic diagram of a computer program, according to an example embodiment.

In some embodiments, the disclosed methods may be implemented as computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-5. In some examples, the signal bearing medium 602 may encompass a non-transitory computer-readable medium 606, such as, but not limited to, a hard disk drive, a Compact Disc (CD), a Digital Video Disk (DVD), a digital tape, memory, etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the signal bearing medium 602 may be conveyed by a wireless form of the communications medium 610.

The one or more programming instructions 604 may be, for example, computer executable and/or logic implemented instructions. In some examples, a computing device such as the computer system 112 of FIG. 1 may be configured to provide various operations, functions, or actions in response to the programming instructions 604 conveyed to the computer system 112 by one or more of the computer readable medium 606, the computer recordable medium 608, and/or the communications medium 610.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. An autonomous vehicle comprising:
   a set of sensors configured to receive data, wherein the data represents objects of an environment of the autonomous vehicle;
   a control system, configured to operate the autonomous vehicle; and
   one or more processors configured to:
   determine, based on the received data, at least one object of the environment that has a detection confidence below a threshold, wherein the detection confidence is indicative of a likelihood that the determined object is correctly identified in the environment; and
   based on the at least one object having a detection confidence below the threshold:
   communicate, from the received data, image data of the at least one object for further processing to a remote operator,
   determine at least one natural-language question associated with the at least one object having a detection confidence below the threshold,
   communicate the at least one natural-language question to the remote operator,
   receive an answer to the at least one natural-language question from the remote operator providing an object indication, and
   provide instructions to control the autonomous vehicle by the control system based on the object indication.

2. The apparatus according to claim 1, wherein the one or more processors are further configured to:
   provide a bounding box substantially around the at least one object in the image data; and
   communicate the image data of the least one object including the bounding box substantially around the at least one object for further processing to the remote operator.

3. The apparatus according to claim 1, wherein the one or more processors are further configured to:
   perform object detection of objects within image data in the received data; and
   determine that the at least one object has the detection confidence below the threshold based on being unable to identify the at least one object with a detection confidence above the threshold.

4. The apparatus according to claim 3, wherein the one or more processors are further configured to:
   determine the at least one natural-language question associated with the at least one object having the detection confidence below the threshold based on a result of the object detection of the at least one object, wherein the at least one natural-language question indicates a possible identification of the at least one object and requests confirmation.

5. The apparatus according to claim 1, wherein the set of sensors comprises a LIDAR sensor and the data indicating the environment comprises LIDAR data.

6. The apparatus according to claim 1, wherein the set of sensors comprises a camera and the data indicating the environment comprises an image.

7. The apparatus according claim 1, wherein the set of sensors comprises a microphone and the data indicating the environment comprises an audio signal.

8. The apparatus according claim 1, wherein providing the instructions to control the autonomous vehicle by the control system based on the object indication comprises providing instructions to switch a mode of the autonomous vehicle to a human-controlled mode.

9. A method comprising:
   receiving data by a set of sensors, wherein the data represents objects of an environment of an autonomous vehicle;
   operating the autonomous vehicle by a control system;
   determining, by a processor, based on the received data, at least one object of the environment that has a detection confidence below a threshold, wherein the detection confidence is indicative of a likelihood that the determined object is correctly identified in the environment; and
   based on the at least one object having a detection confidence below the threshold, the processor:
   communicating, from the received data, image data of the at least one object for further processing to a remote operator,
   determining at least one natural-language question associated with the at least one object having a detection confidence below the threshold,
   communicating the at least one natural-language question to the remote operator,
   receiving an answer to the at least one natural-language question from the remote operator providing an object indication, and
   providing instructions to control the autonomous vehicle by the control system based on the object indication.

10. The method according to claim 9, further comprising:
    providing a bounding box substantially around the at least one object in the image data; and
    communicating the image data of the least one object including the bounding box substantially around the at least one object for further processing to the remote operator.

11. The method according to claim 9, further comprising:
    performing object detection of objects within image data in the received data; and
    determining that the at least one object has the detection confidence below the threshold based on being unable to identify the at least one object with a detection confidence above the threshold.

12. The method according to claim 11, further comprising:
    determining the at least one natural-language question associated with the at least one object having the detection confidence below the threshold based on a result of the object detection of the at least one object, wherein the at least one natural-language question indicates a possible identification of the at least one object and requests confirmation.

13. The method according to claim 9, wherein the set of sensors comprises a LIDAR sensor and the data indicating the environment comprises LIDAR data.

14. The method according to claim 9, wherein the set of sensors comprises a camera and the data indicating the environment comprises an image.

15. The method according claim 9, wherein the set of sensors comprises a microphone and the data indicating the environment comprises an audio signal.

16. The method according claim 9, wherein providing the instructions to control the autonomous vehicle by the control system based on the object indication comprises providing instructions to switch a mode of the autonomous vehicle to a human-controlled mode.

17. An article of manufacture including a non-transitory computer-readable medium having stored thereon instructions that, when executed by a processor in a vehicle system, causes the vehicle system to perform operations comprising:
   receiving data by a set of sensors, wherein the data represents objects of an environment of an autonomous vehicle;
   determining based on the received data, at least one object of the environment that has a detection confidence below a threshold, wherein the detection confidence is indicative of a likelihood that the determined object is correctly identified in the environment; and
   based on the at least one object having a detection confidence below the threshold:
      communicating, from the received data, image data of the at least one object for further processing to a remote operator,
      determining at least one natural-language question associated with the at least one object having a detection confidence below the threshold,
      communicating the at least one natural-language question to the remote operator,
      receiving an answer to the at least one natural-language question from the remote operator providing an object indication, and
      providing instructions to control the autonomous vehicle by the control system based on the object indication.

18. The article of manufacture according to claim 17, wherein the operations further comprise:
   providing a bounding box substantially around the at least one object in the image data; and
   communicating the image data of the least one object including the bounding box substantially around the at least one object for further processing to the remote operator.

19. The article of manufacture according to claim 17, wherein the operations further comprise:
   performing object detection of objects within image data in the received data; and
   determining that the at least one object has the detection confidence below the threshold based on being unable to identify the at least one object with a detection confidence above the threshold.

20. The article of manufacture according to claim 17, wherein the operations further comprise:
   determining the at least one natural-language question associated with the at least one object having the detection confidence below the threshold based on a result of the object detection of the at least one object, wherein the at least one natural-language question indicates a possible identification of the at least one object and requests confirmation.

21. A method comprising:
   determining, by a processor, based on received data, a preliminary identification of at least one object of the environment;
   operating an autonomous vehicle by a control system, based on the preliminary identification; and
   determining, by a processor the at least one object of the environment that has a detection confidence below a threshold, wherein the detection confidence indicates a likelihood that the determined object is present in the environment; and
   based on the at least one object having a detection confidence below the threshold, the processor:
      communicating, from the received data, image data of the at least one object for further processing to a remote operator,
      determining at least one natural-language question associated with the at least one object having a detection confidence below the threshold,
      communicating the at least one natural-language question to the remote operator,
      receiving an answer to the at least one natural-language question from the remote operator providing a corrected identification, and
      providing instructions to control the autonomous vehicle by the control system based on the corrected identification.

22. The method according to claim 21, further comprising:
   performing object detection of objects within image data in the received data; and
   determining that the at least one object has the detection confidence below the threshold based on being unable to identify the at least one object with a detection confidence above the threshold.

23. The method according to claim 21, further comprising:
   determining the at least one natural-language question associated with the at least one object having the detection confidence below the threshold based on a result of the object detection of the at least one object, wherein the at least one natural-language question indicates a possible identification of the at least one object and requests confirmation.

24. The method according to claim 21, wherein altering the instructions to control of the autonomous vehicle comprises switching the autonomous vehicle to a human-controlled mode.

* * * * *